No. 12,085. REISSUED FEB. 24, 1903.

A. E. NORRIS.

CLUTCH MECHANISM.

APPLICATION FILED MAR. 8, 1902.

2 SHEETS—SHEET 1.

Witnesses:

Walter E. Lombard

Ernest S. Emery

Inventor:

Almon E. Norris, by Maurice L. Emery

Atty.

No. 12,085. REISSUED FEB. 24, 1903.

A. E. NORRIS.

CLUTCH MECHANISM.

APPLICATION FILED MAR. 8, 1902.

2 SHEETS—SHEET 2.

Witnesses:

Walter C. Lombard

Emmett S. Emery

Inventor:

Almon E. Norris, by Edmund L. Emery Atty.

UNITED STATES PATENT OFFICE.

ALMON E. NORRIS, OF CAMBRIDGE, MASSACHUSETTS, ASSIGNOR TO RAWSON & MORRISON MANUFACTURING COMPANY, OF CAMBRIDGE, MASSACHUSETTS, A CORPORATION OF MASSACHUSETTS.

CLUTCH MECHANISM.

SPECIFICATION forming part of Reissued Letters Patent No. 12,085, dated February 24, 1903.

Original No. 638,669, dated December 5, 1899. Application for reissue filed March 3, 1902. Serial No. 97,377.

*To all whom it may concern:*

Be it known that I, ALMON E. NORRIS, a citizen of the United States, residing at Cambridge, in the county of Middlesex and Commonwealth of Massachusetts, have invented an Improvement in Clutch Mechanism, of which the following description, in connection with the accompanying drawings, is a specification, like numerals on the drawings representing like parts.

The invention consists in an improved and novel construction and combination comprising a clutch mechanism that is especially fitted for use in connection with the winding-drum mechanism of hoisting and transporting apparatus, although equally adapted for use in a great variety of other connections as well.

In the accompanying drawings I have illustrated the best form and manner in which the invention heretofore has been embodied in reducing the same to practice and have illustrated sufficient of the winding mechanism, in connection with which the invention is employed, to render clear the application of the invention to such mechanism.

The invention first will be described with reference to the said drawings, and the distinguishing and characteristic features of the invention will be particularly pointed out and distinctly defined in the claims at the close of this specification.

Figure 1:
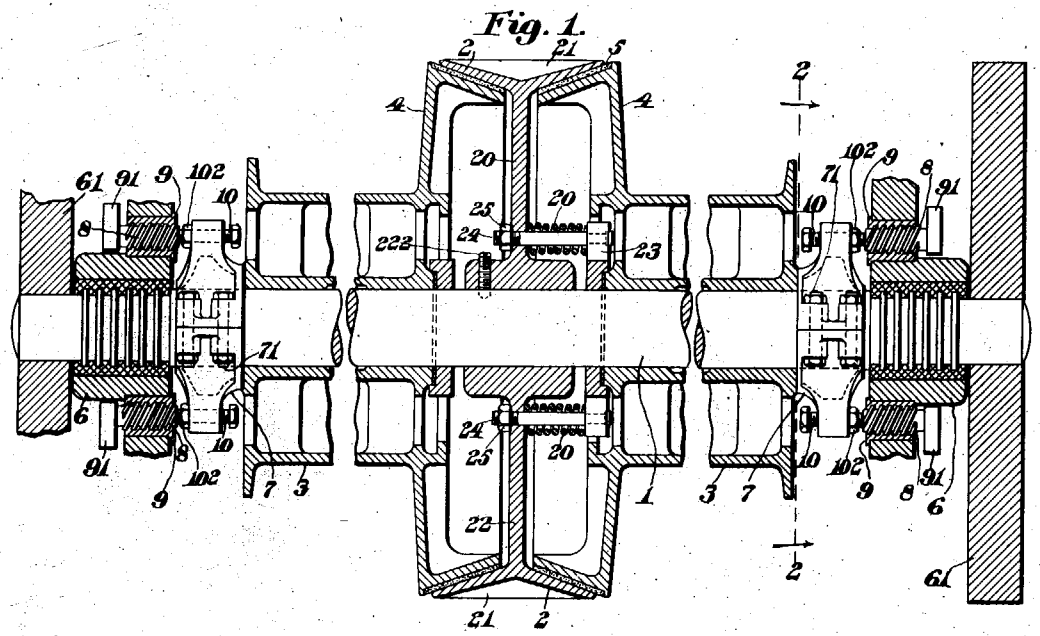
Figure 2:
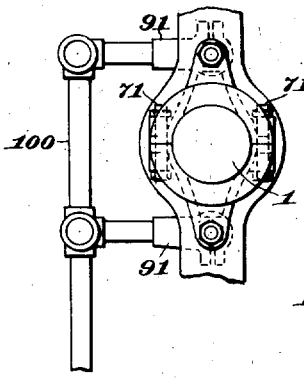
Figure 3:
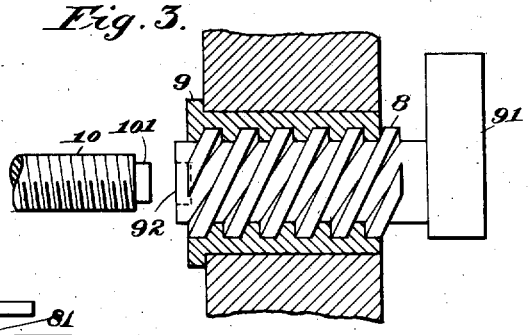
Figure 5:
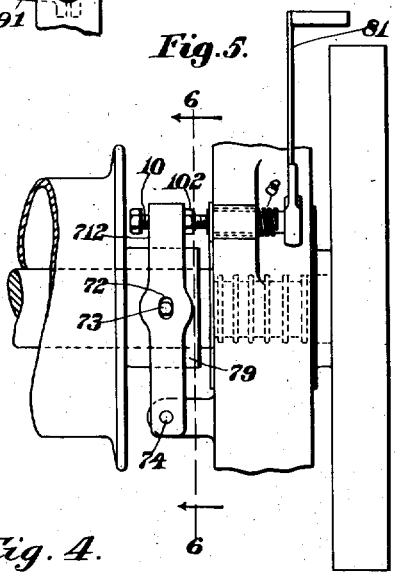
Figure 6:
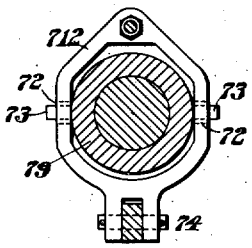
Figure 4:
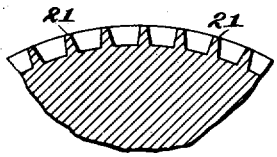

Figure 1 is a view chiefly in longitudinal section on a plane passing through the axis of the shaft, but partly in elevation, showing certain portions of winding mechanism with an embodiment of my invention applied thereto. Fig. 2 is a view in section on line 2 2 of Fig. 1, looking from the left-hand side in Fig. 1, showing certain features of the clutch-operating devices. Fig. 3 is a sectional representation in detail of certain parts of the said devices. Fig. 4 is a view in central section of a small portion of the clutch member 2, and Figs. 5 and 6 are detail views showing a modification.

2 and 4 designate coacting clutch members, the same being constructed to engage with each other for the purpose of enabling one thereof to drive the other. The said clutch members (herein designated 2 and 4, respectively) are designed to be closed together in order to occasion their driving engagement and to be separated in order to effect their disconnection. In the present embodiment of the invention the clutch member 4 is cone-shaped at its periphery, and the clutch member 2 has a correspondingly-shaped recess to receive the cone. It is customary in practice to provide for increasing the frictional adhesion of the clutch members 2 and 4 to each other through the employment of some frictional material. In the drawings, 5 designates a surfacing, of leather or the like, which is applied to the periphery of the cone 4. I have thus far described merely the features of a well-known type of friction-clutch. It should be borne in mind that this is only one of the ordinary forms of clutches which are in use and that for the purposes of the present invention any one of a considerable variety of clutches may be substituted in lieu of the form of clutch shown, also that the invention is not wholly restricted to application to friction-clutches. In the present case the clutch member 2 is shown fixed upon a shaft 1, it being connected with the latter, so as to cause it to rotate in unison with the said shaft and also so as to prevent it from having movement endwise thereon by means of a screw 222, although any other suitable and well-known devices for fixing a pulley to a shaft may be used. Each clutch member 4 is shown mounted concentrically with the said shaft and with capacity to turn independently thereof when the clutch members 2 and 4 are separated from each other, each said clutch member 4 being herein represented as connected with a winding-drum 3, which in practice receives on its exterior a hoisting-rope. (Not shown.) The drawings show a duplicated arrangement of parts on the said shaft 1, there being mounted loosely and concentrically with the said shaft two winding-drums 3 3, each having connected therewith a clutch member 4. The clutch member 2, which is located at mid-length of the shaft and between the two winding-drums, is made double, so as to enable either or both of the clutch members 4 4, pertaining to the winding-drums 3 3, to be engaged with the said clutch member 2, as may be required in practice. This duplicated arrangement involves the use of two sets of the clutch devices; but inasmuch as the general arrangement is old in practice and does not enter into the invention I shall in the following description confine myself to references to the parts of a single set of the devices.

For the purpose of causing the clutch members 2 and 4 to tend to separate, so that when permitted to open the said clutch members normally shall stand separated and out of engagement with each other, I interpose between the same a spring or springs which shall be compressed when the movable clutch member 4 is pressed against the fixed clutch member 2 and which by the tension or elasticity thereof shall bear the clutch member 4 away from the clutch member 2 when permitted to act. Thus in the drawings I have shown two spiral springs 20 20 employed for the purpose, these springs being mounted upon bolts or pins 24 24, projecting loosely through holes in the web 22 of the fixed clutch member 2 and attached to a collar 23, which last acts against the end of the hub of the movable clutch member 4. Nuts 25 25 on the free extremity of the pins or bolts 24 24 limit the extent of the movement of the collar 23 under the action of the springs 20 20 and prevent the withdrawal of the pins or studs 24 24 from the holes in the web 22 of the fixed clutch member.

6 6 designate the bearings in which the shaft 1 is mounted, the said bearings being provided on suitable supporting-framing and preferably being constructed in some suitable manner to resist the tendency to end thrust of shaft 1 resulting from the action of the clutch. In the drawings I have illustrated a simple form of thrust-bearing in which the lining thereof is formed with a series of parallel annular grooves to receive a corresponding series of projecting rings or collars on the journal portion of the shaft. On the shaft I mount one or more crank-disks 61 61, to which motive power is applied in suitable manner, as by means of an engine of the kind commonly employed in the like connection. Between the bearing 6 or some equivalent abutment or abutments exterior to shaft 1 and the adjacent end of the hub of the proximate winding-barrel 3 I interpose a collar 7, which is concentric with the shaft 1, but not intended to turn in unison therewith. This collar is intended to act in connection with the said hub for the purpose of enabling the clutch member 4 to be shifted relatively to the clutch member 2, and it will be apparent that the hub in question is, in effect, the hub of the movable clutch member 4. For the purpose of moving the collar 7 laterally, so as to press the movable clutch member 4 against the fixed clutch member 2, I apply to the bearing 6 or other convenient fixed support or supports a plurality of screws 8 8, which last, in view of the results attained by their use, I term "clutch-operating" screws. I show herein two of such screws, the same being disposed with their length parallel with that of the shaft 1 and they being placed at opposite sides of the shaft. The threaded portions of the said screws 8 8 are fitted to correspondingly threaded sockets, which sockets may conveniently be formed in bushings 9 9, applied to the fixed support or supports which carries the screws. (See more particularly Fig. 3 of the drawings.) The inner ends of the said screws are intended to act in connection with the collar 7, and they may engage directly with fixed or non-adjustable portions connected with the said collar, although, preferably, they engage with the ends of adjusting-screws 10 10, which last are fitted to threaded sockets in the said collar. The said adjusting-screws 10 10 are provided with lock-nuts 102 102 to guard against accidental loss of adjustment. The reduced or plain ends 101 of the adjusting-screws 10 10 enter sockets 92 in the inner ends of the operating-screws 8 8, by which means the screws 8 8 and 10 10 conveniently are engaged with one another in pairs, so as to prevent rotation of the collar 7. For the purpose of partially rotating the operating-screws 8 8 in unison with each other in either one direction or the other and to the extent which is necessary in order to press collar 7 along shaft 1 far enough to move the clutch member 4 into engagement with the clutch member 2 or permit the action of the springs 20 20 to move the clutch member 4 and collar 7 reversely sufficiently to enable said clutch member 4 to be forced out of engagement with clutch member 2 I attach to each screw 8 an arm 91. The two arms 91 91 project in the same direction from the two screws 8 8, and they are united or linked together by a rod 100. This provides for conveniently rotating the said screws 8 8 by force applied by hand to rod 100 either directly or indirectly in unison with each other to the extent which is required in order to occasion the amount of endwise movement of the operating-screws 8 8 necessary to provide for the lateral shift of the clutch member 4 into or out of engagement with the clutch member 2. The application of the adjusting-screws 10 10 to the collar 7 enables adjustment to be effected to compensate for wear of the contacting portions or surfaces of the clutch members 2 and 4 or between the collar 7 and the hub of winding-barrel 3 without it being necessary to adjust the screws 8 8 themselves.

Sometimes it becomes necessary in practice to repair or replace the frictional surfacing material of the clutch members, or for other reasons it becomes necessary to separate the said clutch members completely from each other. In order to enable the said clutch members thus to be separated, I make the collar 7 in sections, as indicated in the drawings, which sections are separable from each other and are provided with suitable means of securing them together after they have been fitted around the shaft 1. In the drawings, 71 71 designate bolts by means of which the said sections may be secured together. The separable and removable construction may be secured in other ways than that shown in the sketch. After the removal of the collar 7 the winding-drum and clutch member 4 may be moved along the shaft 1 as far as the bearing or abutment at 6. After they have been restored to their working position by a reverse movement of the same upon the shaft 1 the collar 7 may be reapplied and secured in place.

In the working of winding apparatus used for hoisting and transportation purposes and containing the clutch mechanism which is presented herein considerable heat is generated by the friction between the contacting surfaces of the clutch members. In order to dissipate the heat, the exterior of the clutch member 2 is formed with projecting ribs, as 21 21. (See Figs. 1 and 4.) These give a more extensive surface for heat radiation and also disturb the air, so as to increase the loss of heat by convection.

Figs. 5 and 6 illustrate the manner in which the clutch-operating collar may be operated by means of a single screw 8. In the case of the construction which is represented in these figures the connection of the collar which is engaged by the operating-screw 8 is in the form of a yoke-shaped lever, as 712, which latter is slotted, as at 72, to receive pins, as 73 73, projecting from the collar, which here is designated 79, the said yoke-shaped lever 712 being fulcrumed on a fixed portion on the adjacent framing, as by means of the pivot-pin 74. In this case the operating-screw 8 is provided with a handle, as 81, by means of which to rotate the same, and its inner end may engage with an adjusting-screw 10, carried by the yoke-shaped lever 712.

What I claim as my invention is—

1. In a clutch mechanism, the combination with a shaft, of fixed and movable clutch members mounted on said shaft, a non-rotating support or abutment adjacent said movable clutch member, a non-rotating collar on said shaft between said movable clutch member and said support or abutment, said collar being split or separable to permit its removal from said shaft, and thereby allow movement of the movable clutch member on said shaft and separation of said clutch members, and a screw mounted in the said support or abutment at the side of said shaft and non-axial therewith and means to rotate said screw and thereby move said collar lengthwise the shaft and occasion the operation of the clutch mechanism.

2. In a clutch mechanism, the combination with a shaft, of fixed and movable clutch members mounted on said shaft, a non-rotating support or abutment adjacent said movable clutch member, a non-rotating collar concentric with said shaft and exterior thereto between said movable clutch member and said support or abutment, an adjusting-screw connected with said collar, a clutch-operating screw mounted in said support or abutment outside the periphery of said shaft and engaging said adjusting-screw, and means to rotate said clutch operating screw and thereby move said collar lengthwise the shaft and occasion the operation of the clutch mechanism.

3. In a clutch mechanism, the combination with a shaft, of fixed and movable clutch members mounted on said shaft, a non-rotating support or abutment adjacent said movable clutch member, a non-rotating collar concentric with said shaft and exterior thereto between said movable clutch member and said support or abutment, adjusting-screws mounted in said collar, clutch-operating screws mounted in said support or abutment outside the periphery of said shaft and engaging said adjusting-screws, and means to rotate said clutch-operating screws and thereby move said collar lengthwise the shaft and occasion the operation of the clutch mechanism.

4. In a clutch mechanism, the combination with a shaft, of fixed and movable clutch members mounted on said shaft, a non-rotating support, or abutment adjacent said movable clutch member, a non-rotating collar concentric with said shaft and exterior thereto between the said movable clutch member and said support or abutment, adjusting-screws mounted in said collar and provided with sockets in their ends adjacent said support or abutment, clutch-operating screws fitted in bearings in said support or abutment outside the periphery of said shaft, said clutch-operating screws entering the sockets in and engaging with said adjusting-screws, and means to rotate the said clutch-operating screws to move said collar lengthwise the shaft and occasion the operation of the clutch.

5. In an apparatus of the class described, a shaft, a fixed non-rotatable abutment through which the shaft passes, fixed and movable clutch members, the latter arranged between said fixed clutch member and said abutment, an axially-movable collar surrounding said shaft between said abutment and said movable clutch member, and clutch-operating means supported by the abutment and interposed between the same and said collar to cause movement of said movable clutch member.

6. In an apparatus of the class described, a shaft, a fixed non-rotatable abutment through which the shaft passes, fixed and movable clutch members, the latter arranged between said fixed clutch member and said abutment, an axially-movable collar surrounding said shaft between said abutment and said movable clutch member, and clutch-operating means located at the side of the shaft and non-axial therewith interposed between said abutment and said collar to cause movement of said movable clutch member.

7. In an apparatus of the class described, a shaft, a fixed non-rotatable abutment through which the shaft passes, fixed and movable clutch members, the latter arranged between said fixed clutch member and said abutment, an axially-movable collar surrounding said shaft between said abutment and said movable clutch member, a plurality of rotatable clutch-operating members intermediate said abutment and said collar and supported by said abutment, and means to rotate said operating members to cause movement of said movable clutch member.

8. In an apparatus of the class described, a shaft, a fixed non-rotatable abutment, fixed and movable clutch members, the latter arranged between said fixed clutch member and said abutment, an axially-movable collar surrounding said shaft between said abutment and said movable clutch member, a plurality of rotatable clutch-operating members intermediate said abutment and said collar and located at the side of said shaft and non-axial therewith, and means to rotate said operating members to cause movement of said movable clutch member.

9. In an apparatus of the class described, a shaft and means to rotate it, fixed non-rotatable abutments through which the shaft passes, a fixed double-clutch member fast on said shaft, and movable clutch members also on said shaft at opposite sides of said fixed clutch member and to coöperate therewith, axially-movable collars respectively surrounding said shaft between said movable clutch members and said abutments, separate operating means for said collars, and intermediate the latter and their adjacent abutments, said operating means being supported by said abutments, and means for independently working said operating means to shift said movable clutch members independently into and out of engagement with said fixed clutch members.

10. In an apparatus of the class described, a fixed non-rotatable abutment, fixed and movable clutch members, the latter arranged between said fixed clutch member and said abutment, an axially-movable collar surrounding said shaft between said abutment and said movable clutch member, a rotatable clutch-operating member intermediate said abutment and said collar and located at the side of said shaft and non-axial therewith and means to rotate said operating member to cause movement of said movable clutch member.

11. In an apparatus of the class described, a fixed non-rotatable abutment, fixed and movable clutch members, the latter arranged between said fixed clutch member and said abutment, an axially-movable collar surrounding said shaft between said abutment and said movable clutch member, a rotatable clutch-operating member supported by said abutment interposed between the same and said collar and located at the side of said shaft and non-axial therewith to cause movement of said movable clutch member.

In witness whereof I have hereunto set my hand.

ALMON E. NORRIS.

Witnesses:
A. E. CHESLEY,
EVERETT S. EMERY.